(12) United States Patent
Sakuma

(10) Patent No.: US 8,544,965 B2
(45) Date of Patent: Oct. 1, 2013

(54) BRAKE SYSTEM

(75) Inventor: Masaru Sakuma, Kai (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 285 days.

(21) Appl. No.: 13/038,894

(22) Filed: Mar. 2, 2011

(65) Prior Publication Data

US 2011/0215638 A1 Sep. 8, 2011

(30) Foreign Application Priority Data

Mar. 3, 2010 (JP) ................................. 2010-046826

(51) Int. Cl.
*B60T 8/32* (2006.01)

(52) U.S. Cl.
USPC ......................................... 303/113.4; 303/155

(58) Field of Classification Search
USPC ............. 303/3, 15, 20, 113.1–113.4; 60/538, 60/545, 547.1–588
See application file for complete search history.

(56) References Cited

U.S. PATENT DOCUMENTS

| | | | |
|---|---|---|---|
| 6,474,750 B2* | 11/2002 | Tanaka et al. | 303/113.4 |
| 2006/0197373 A1 | 9/2006 | Kanagawa et al. | |
| 2008/0231109 A1 | 9/2008 | Yamada et al. | |
| 2009/0039702 A1* | 2/2009 | Nishino et al. | 303/114.1 |
| 2009/0045672 A1* | 2/2009 | Nishino et al. | 303/113.3 |
| 2009/0229931 A1* | 9/2009 | Baumann et al. | 188/72.2 |
| 2010/0026083 A1* | 2/2010 | Leiber et al. | 303/3 |
| 2011/0073419 A1* | 3/2011 | Matsuzaki et al. | 188/106 P |
| 2011/0241418 A1* | 10/2011 | Nozawa et al. | 303/3 |
| 2012/0073285 A1* | 3/2012 | Sakuma | 60/538 |
| 2012/0091787 A1* | 4/2012 | Nishino et al. | 303/14 |

FOREIGN PATENT DOCUMENTS

| | | |
|---|---|---|
| JP | 2006-240542 | 9/2006 |
| JP | 2008-239142 | 10/2006 |

* cited by examiner

*Primary Examiner* — Christopher Schwartz
(74) *Attorney, Agent, or Firm* — Wenderoth, Lind & Ponack, L.L.P.

(57) ABSTRACT

Provided is a brake system capable of preventing fuel efficiency of a vehicle from being lowered. After a brake pedal is released, a pump is driven under a state in which opening/closure of valves included in an ABS/VDC actuator are regulated so that pressure-reduction control for returning a brake fluid in wheel cylinders to a master cylinder is performed. Therefore, the brake fluid remaining in the wheel cylinders is returned to the master cylinder via the pump to increase a hydraulic pressure of the master cylinder. As a result, return characteristics of an electric actuation unit are improved. Therefore, for example, even if viscosity of grease applied onto a rotary-to-linear motion converting mechanism is increased at a low temperature or the like, pistons of the master cylinder can be appropriately returned to initial positions.

20 Claims, 8 Drawing Sheets

BRAKE SYSTEM

BACKGROUND OF THE INVENTION

I. Technical Field

The present invention relates to a brake system used for a vehicle.

II. Description of the Related Art

As an example of a brake system which uses a master cylinder, an electric booster including a rotary-to-linear motion converting mechanism (ball screw), a hydraulic control mechanism, and control means, a brake system described in Japanese Patent Application Laid-open No. 2008-239142 is known. As an example of a hydraulic booster for regulating a hydraulic pressure generated from a hydraulic pressure source using a pressure regulating valve to allow the master cylinder to generate a boosted force, a hydraulic booster described in Japanese Patent Application Laid-open No. 2006-240542 is known.

SUMMARY OF THE INVENTION

The brake system described in Japanese Patent Application Laid-open No. 2008-239142 has a fear in that the master cylinder is stopped in a state in which the hydraulic pressure is generated by the master cylinder because a piston of the master cylinder cannot be completely returned to an initial position (specifically, return characteristics are lowered) due to an increase in viscosity of grease applied onto the rotary-to-linear motion converting mechanism of the electric booster at a low temperature, or a reduction in spring force of a return spring or an increase in frictional resistance between components, which occurs with elapse of time. In the hydraulic booster described in Japanese Patent Application Laid-open No. 2006-240542, when a problem corresponding to degraded movement of a pressure regulating valve spool occurs due to a spring caught by a circumferential surface of an output hydraulic chamber, the pressure regulating valve spool cannot be desirably returned even if a pressure on the brake pedal is reduced. Therefore, the piston of the master cylinder cannot be completely returned to the initial position as in the case described above. In such a state, a so-called "drag" state in which brake pads are brought into contact with a disc rotor by the hydraulic pressure generated by the master cylinder is brought about, which disadvantageously leads to a reduction in fuel efficiency of a vehicle.

The present invention has an object to provide a brake system capable of improving return characteristics.

A brake system according to the present invention includes: a master cylinder for generating a brake fluid pressure by movement of a piston; a booster for actuating the piston of the master cylinder according to an amount of an operation of a brake pedal; a hydraulic control mechanism provided between the master cylinder and wheel cylinders, the hydraulic control mechanism including a pump, for performing pressure intensification and pressure reduction of the brake fluid pressure for the wheel cylinders; and control means for controlling the hydraulic control mechanism, the control means performing the pressure reduction for returning a brake fluid in the wheel cylinders to the master cylinder by driving the pump of the hydraulic control mechanism after the actuation of the piston by the booster is released.

DETAILED DESCRIPTION OF THE INVENTION

First Embodiment

Figure 1:
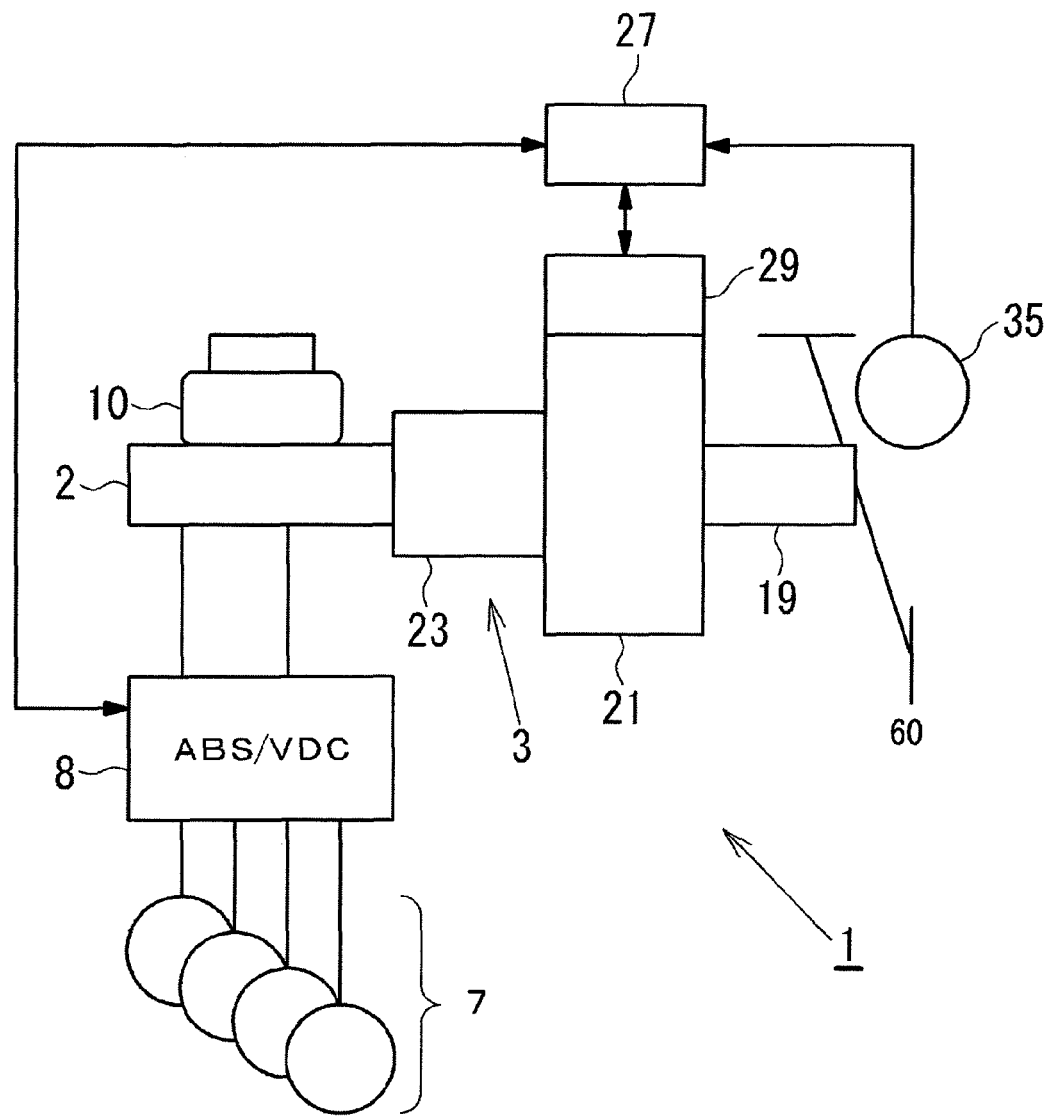
FIG. 1 is a diagram schematically illustrating a brake system according to a first embodiment of the present invention.
Figure 2:
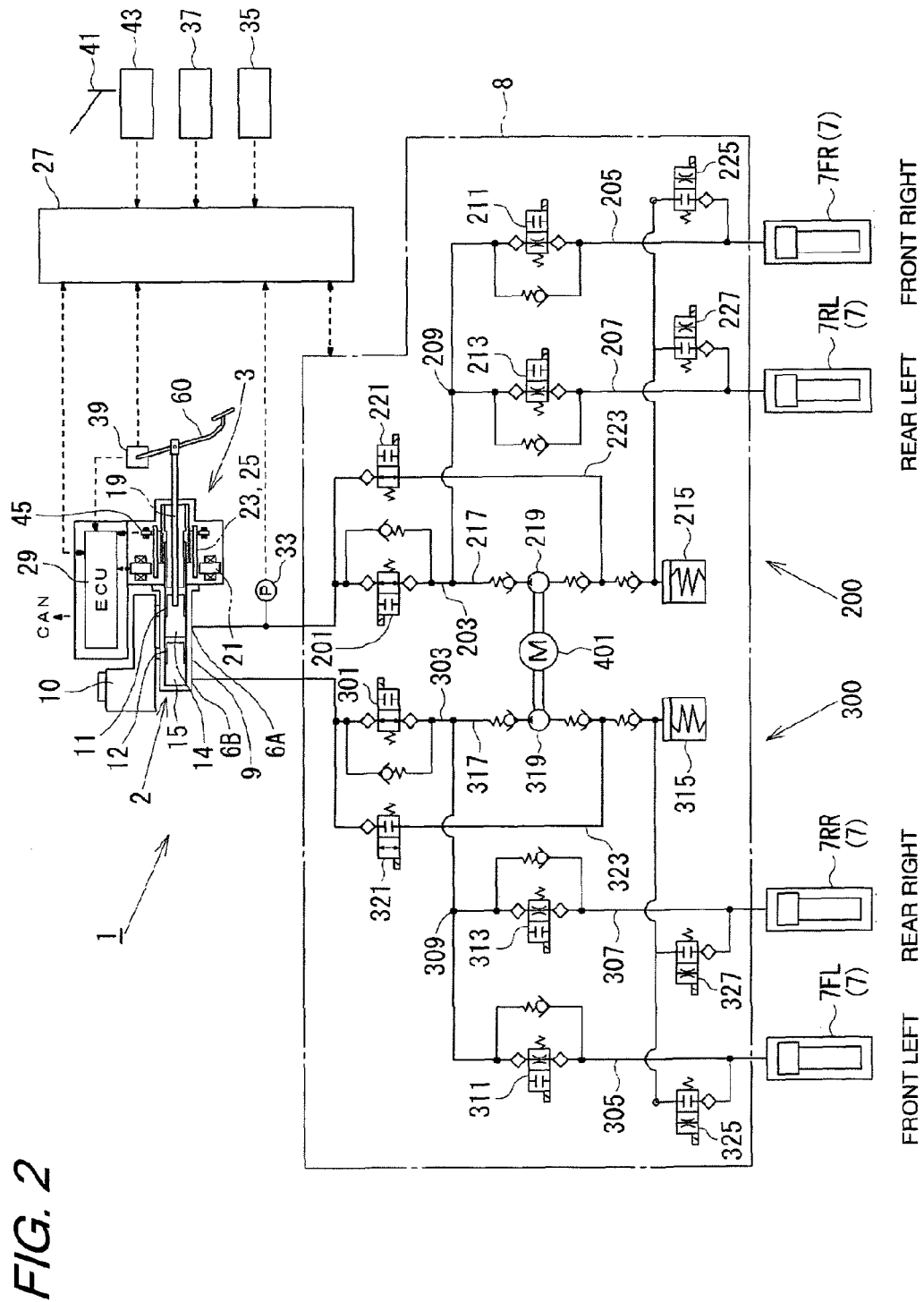
FIG. 2 is a diagram schematically illustrating a control system of the brake system illustrated in FIG. 1 and brake fluid systems of an ABS/VDC actuator illustrated in FIG. 1.

A brake system 1 according to a first embodiment of the present invention is described with reference to FIGS. 1 to 4. The brake system 1 according to the first embodiment is used for an automobile (not shown) corresponding to an example of a vehicle. The brake system 1 is configured to demonstrate a normal braking function for generating a braking force mainly when the automobile is running and a parking braking function for generating the braking force when the automobile is to be parked. As illustrated in FIGS. 1 and 2, the brake system 1 includes a tandem master cylinder (hereinafter, referred to simply as "master cylinder" as needed) 2 and an electric actuation unit 3 corresponding to a booster to be assembled integrally to the master cylinder 2. A brake fluid pressure is generated in the master cylinder 2 according to an operation of a brake pedal 60.

The brake system 1 includes wheel cylinders 7 corresponding to four wheels (not shown) (front left wheel (FL wheel), front right wheel (FR wheel), rear left wheel (RL wheel), rear right wheel (RR wheel)) of the automobile. The wheel cylinders 7 corresponding to the four wheels are hereinafter respectively referred to as a front left (FL) wheel cylinder 7FL, a front right (FR) wheel cylinder 7FR, a rear left (RL) wheel cylinder 7RL, and a rear right (RR) wheel cylinder 7RR as needed.

Although not shown, each of the wheel cylinders 7 constitutes a disc brake with a caliper portion including a cylinder, a piston housed within the cylinder so as to be movable forward and backward, and pads to be pressed against a disc by the piston. As a brake device including one of the wheel cylinders 7, a drum brake can be used. Each of the wheel cylinders 7 receives the supply of a brake fluid from the master cylinder 2 through an intermediation of an ABS/VDC actuator 8 corresponding to a hydraulic circuit for an antilock brake system (ABS) and a vehicle dynamics control (VDC) system to thrust the piston (not shown). In this manner, the pads are pressed against a disc rotor (not shown), which rotates integrally with a corresponding wheel, so as to exert a braking force on the corresponding wheel. In this embodiment, the ABS/VDC actuator 8 constitutes a hydraulic control mechanism.

The master cylinder 2 includes a cylinder main body 9 having a closed end and a reservoir 10. The interior of the cylinder 9 is partitioned into two pressure chambers 14 and 15 by a primary piston 11 and a secondary piston 12. According to the forward movement (movement to the left of FIG. 2) of the pistons 11 and 12, a brake fluid enclosed in the pressure chamber 14 is pressure-fed from an eject port 6A through the ABS/VDC actuator 8 to the corresponding wheel cylinders 7; and, in the same manner, a brake fluid enclosed in the pressure chamber 15 is pressure-fed from an eject port 6B through the ABS/VDC actuator 8 to the corresponding wheel cylinders 7. The eject ports 6A and 6B are provided to the cylinder main body 9 so as to respectively correspond to the pressure chambers 14 and 15. Moreover, as described below, the brake fluid is returned from the wheel cylinders 7 to the pressure chambers 14 and 15 through an intermediation of the ABS/VDC actuator 8 (in other word, a pressure in the wheel cylinders 7 is reduced by the ABS/VDC actuator 8 so that the amount of the brake fluid corresponding to the amount of pressure reduction is returned to the pressure chambers 14 and 15). As a result, the primary piston 11 and the secondary piston 12 are subjected to a force in a backward direction (return force).

The electric actuation unit 3 includes an input member 19 and an assist member 25. The input member 19 is moved forward and backward by an operation of the brake pedal 60. The assist member 25 is moved forward and backward by an electric rotary motor 21 through an intermediation of a rotary-to-linear movement converting mechanism 23 according to the input member 19 to actuate the primary piston 11 (corresponding to one of the pistons of the master cylinder) of the master cylinder 2. The electric actuation unit 3 transmits an operating force of the brake pedal 60 through an intermediation of the input member 19 to the piston (primary piston 11) of the master cylinder 2 and converts a rotary torque of the electric rotary motor 21 through an intermediation of the assist member 25 and the rotary-to-linear motion converting mechanism 23 into a linear force so as to transmit the linear force to the piston (primary piston 11) of the master cylinder 2. A ball screw is used as the rotary-to-linear motion converting mechanism 23 in this embodiment. However, the rotary-to-linear motion converting mechanism of the present invention is not limited thereto. A mechanism such as a roller screw or a rack-and-pinion may also be used.

The brake system 1 includes a high-order ECU 27 and an electric actuation ECU 29. The high-order ECU (hereinafter, referred to as an ABS/VDC actuator ECU) 27 controls the ABS/VDC actuator 8 and the overall brake system including the electric actuation unit 3. The electric actuation ECU 29 controls the electric actuation unit 3 and is connected to the ABS/VDC actuator ECU 27 so as to be able to transmit and receive information to/from the ABS/VDC actuator ECU 27. In addition, the electric actuator ECU 29 can execute a command from the ECU 27.

In this embodiment, the ABS/VDC actuator ECU 27 and the electric actuation ECU 29 constitute control means.

The brake system 1 further includes sensors described in (i) to (vii) below:

(i) A hydraulic pressure sensor 33 corresponding to hydraulic pressure detection means for detecting the brake fluid pressure of the pressure chamber 14 of the master cylinder 2;

(ii) A hydraulic sensor (not shown) for detecting the brake fluid pressure of the wheel cylinders 7;

(iii) A temperature sensor 35 for detecting a temperature of an area where the brake system 1 is provided (environmental temperature);

(iv) A parking brake state detection sensor 37 (parking state detection means) for detecting a state (an operating state and a non-operating state) of the parking brake;

(v) A brake-pedal operation detection sensor 39 for detecting a state of operation (whether or not an operation is performed and an amount of operation) of the brake pedal 60 by a driver;

(vi) An accelerator-pedal operation detection sensor 43 for detecting an operation (whether or not an operation is performed and an amount of operation) of an accelerator pedal 41; and (vii) A motor-position detection sensor 45 such as a resolver, for detecting a rotational position of the electric rotary motor 21 to output the detected rotational position as motor position information.

In the brake system 1, the operation of the brake pedal 60, which is performed by the driver, is detected by the brake-pedal operation detection sensor 39. Based on the detected amount of operation of the brake pedal 60, the electric actuation ECU 29 drives the electric rotary motor 21. Then, a rotary torque of the electric rotary motor 21 is converted into a linear thrust by the rotary-to-linear motion converting mechanism 23 to press the primary piston 11 of the master cylinder 2 so as to generate the brake fluid pressure. The brake fluid from the master cylinder 2 passes through the ABS/VDC actuator 8 to be fed to the wheel cylinders 7.

The electric actuation ECU 29 and the ABD/VDC actuator ECU 27 constantly communicate with each other.

The ABS/VDC actuator 8 includes two independent brake hydraulic systems (hereinafter, also referred to individually as a primary-side brake hydraulic system and a secondary-side brake hydraulic system as needed) 200 and 300, as illustrated in FIG. 2. A base end of the primary-side brake hydraulic system 200 is connected to the eject port 6A, whereas a base end of the secondary-side brake hydraulic system 300 is connected to the eject port 6B. The primary-side brake hydraulic system 200 feeds and ejects the brake fluid to the FR wheel cylinder 7FR and the RL wheel cylinder 7RL under control of the ABS/VDC actuator ECU 27 so as to adjust braking forces for the FR wheel and the RL wheel. In addition, the primary-side brake hydraulic system 200 performs return control of the brake fluid to the master cylinder 2 (pressure-reduction control for the corresponding wheel cylinders 7). The secondary-side brake hydraulic system 300 feeds and ejects the brake fluid to the FL wheel cylinder 7FL and the RR wheel cylinder 7RR under control of the ABS/VDC actuator ECU 27 so as to adjust braking forces for the FL wheel and the RR wheel. In addition, the secondary-side brake hydraulic system 300 performs return control of the brake fluid to the master cylinder 2 (pressure-reduction control for the corresponding wheel cylinders 7).

The primary-side brake hydraulic system 200 and the secondary-side brake hydraulic system 300 are configured in equivalent forms by using equivalent members. The equivalent members of the brake hydraulic systems 200 and 300 are respectively denoted by three-digit numbers. The three-digit numbers have the same tenth place digit and ones place digit. However, a hundreds place digit of the three-digit number denoting each of the members of the primary-side brake hydraulic system 200 is "2", whereas a hundreds place digit of the three-digit number denoting each of the members of the secondary-side brake hydraulic system 300 is "3". For example, suction valves corresponding to the equivalent members are respectively used in the brake hydraulic systems 200 and 300. The suction valve of the primary-side brake hydraulic system 200 is denoted by the reference numeral 221, whereas the suction valve of the secondary-side brake hydraulic system 300 is denoted by the reference numeral 321. For the primary-side brake hydraulic system 200 and the secondary-side brake hydraulic system 300, the primary-side brake hydraulic system 200 is representatively described for convenience as needed.

The primary-side brake hydraulic system 200 includes a brake fluid passage 203 having a base end connected to the eject port 6A. A cut valve 201 is provided in a distal end portion (portion close to the side where the wheel cylinders 7 are provided) of the brake fluid passage 203. The hydraulic pressure sensor 33 is connected to a portion of the brake fluid passage 203 on the side of the cut valve 201, which is close to the eject port 6A.

A first passage 205 of the primary-side brake hydraulic system 200 is connected to the FR wheel cylinder 7FR, whereas a second passage 207 of the primary-side brake hydraulic system 200 is connected to the RL wheel cylinder 7RL. A normally-open inlet solenoid valve 211 for pressure intensification is provided in the middle of the first passage 205, whereas a normally-open inlet solenoid valve 213 for pressure intensification is provided in the middle of the second passage 207.

A branch passage 217 branching from a portion of the brake fluid passage 203, which is located between a branch portion 209 between the first and second passages and the cut valve 201, to be connected to an ABS/VDC reservoir 215 (hereinafter, the branch passage is referred to as "primary ABS/VDC reservoir-side branch passage 217") is provided. A pump 219 to be driven by a motor 401 used in common by the secondary-side brake hydraulic system 300 is provided in the primary ABS/VDC reservoir-side branch passage 217. A portion of the primary ABS/VDC reservoir-side branch passage 217, which is located between the pump 219 and the ABD/VDC reservoir 215, and a portion of the brake fluid passage 203 on the side of the cut valve 201, which is close to the master cylinder 2 (hereinafter, also referred to as "upstream"), are brought into communication with each other by a passage 223 in which a normally-closed suction valve 221 is provided. The FR wheel cylinder 7FR and the RL wheel cylinder 7RL are connected to the ABS/VDC reservoir 215 through an intermediation of a normally-closed outlet solenoid valve 225 for pressure reduction and a normally-closed outlet solenoid valve 227 for pressure reduction, respectively. The hydraulic pressure sensor 33 is connected to the base end side of the brake fluid passage 203 so as to detect a hydraulic pressure of the pressure chamber 14 of the master cylinder 2.

The cut valve 201 (301), the inlet solenoid valves 211 and 213 (311 and 313), the suction valve 221 (321), the outlet solenoid valves 225 and 227 (325 and 327), and the electric motor 401 for the pumps are controlled by the ABS/VDC actuator ECU 27.

The ABS/VDC actuator ECU 27 controls the ABS/VDC actuator 8 in cooperation with the electric actuation ECU 29. The contents of the control performed by the ABS/VDC actuator ECU 27 include pressure-reduction control for returning the brake fluid in the wheel cylinders 7 to the master cylinder 2 by driving the pump 219 of the ABS/VDC actuator 8 after the operation of the brake pedal 60 is released.

The above-mentioned control performed by the ABS/VDC actuator ECU 27 is described further in detail below referring to a flowchart of FIG. 3, taking the case where the electric actuation unit 3 and the ABS/VDC actuator 8 both normally operate as an example.

First, an operating state of the brake pedal 60, which is performed by the driver, is detected based on a value detected by the brake-pedal operation detection sensor 39 (Step S1).

Next, the electric actuation ECU 29 and the ABS/VDC actuator ECU 27 perform communication with each other (Step S2). In Step S2, the information detected by the hydraulic pressure sensor 33, the motor position information of the electric rotary motor 21, which is output from the motor position detection sensor 45, the environmental temperature information of the temperature sensor 35, and the like are received and transmitted through the communication.

Next, based on the operating state detected in Step S1, whether or not the brake operation is being performed by the driver is determined (Step S3). When it is determined that the brake operation is being performed by the driver, the processing proceeds to Step S4 in which a value of a brake non-operation timer is cleared. Then, the processing is terminated. Here, the brake non-operation timer is a timer for counting elapsed time from the termination of the brake operation by the driver. When it is determined in Step S3 that the brake operation is not performed by the driver, the processing proceeds to Step S5 in which the value of the brake non-operation timer is incremented. In Step S6 subsequent to Step S5, whether or not the elapsed time from the termination of the brake operation is equal to or longer than a predetermined time, specifically, whether or not the value of the brake non-operation timer is equal to or larger than a predetermined value is determined. When the value of the brake non-operation timer is smaller than the predetermined value, specifically, the elapsed time is shorter than the predetermined time (about one to three seconds), whether or not an ABS pressure-reduction and pump-back operation is required because of the degradation of return performance of the electric actuation unit 3 is determined based on the following information (a), (b), and (c) (Step S7):

(a) The brake fluid pressure information of the master cylinder 2 (value detected by the hydraulic pressure sensor 33) or brake fluid pressure information of the wheel cylinders 7 (value detected by a hydraulic pressure sensor (not shown));

(b) The motor position information of the electric rotary motor 21 (value detected by the motor position detection sensor 45); and (c) The environmental temperature information (value detected by the temperature sensor 35).

For the determination of the necessity of the ABS pressure-reduction and pump-back operation, it can be determined that the ABS pressure-reduction and pump-back operation is required when any one of or the combination of conditions, for example, (a) the hydraulic pressure equal to or larger than a reference hydraulic pressure is detected by the hydraulic pressure sensor 33 for the master cylinder 2 or the hydraulic pressure sensor for the wheel cylinders 7, (b) it is detected that the electric rotary motor 21 has not returned to a predetermined reference position, based on the motor position information from the motor position detection sensor 45, and (c) it is detected that the value detected by the temperature sensor 35 has become equal to or lower than a reference temperature determined based on viscosity characteristics according to a temperature of grease, is satisfied.

In Step S7, when it is determined that the ABS pressure-reduction and pump-back operation is required, the pump-back operation corresponding to the pressure-reduction control (ABS pressure-reduction and pump-back operation) is performed (Step S8).

Figure 4:
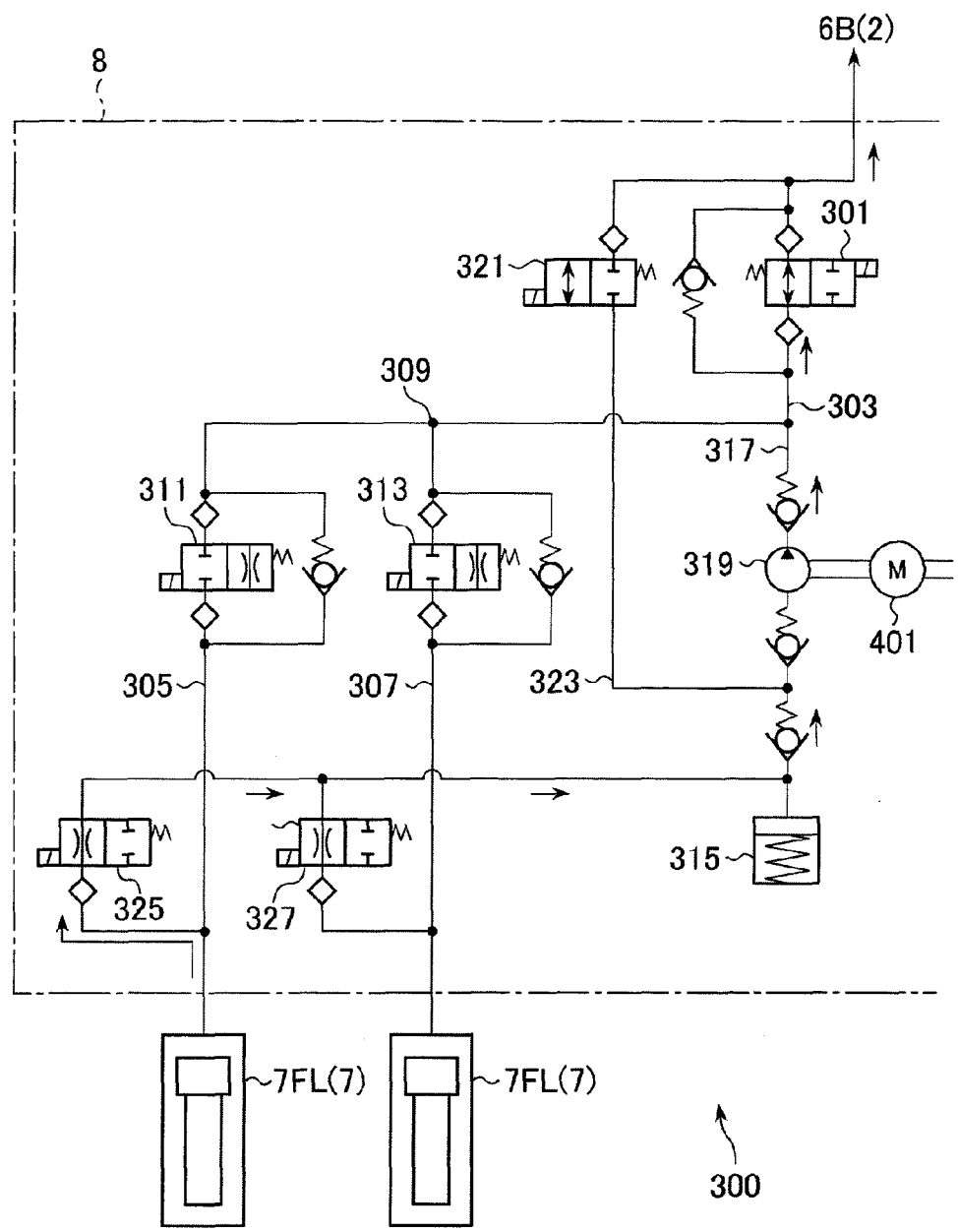
FIG. 4 is a view for illustrating drive statuses of valves and a motor included in the ABS/VDC actuator when processing of Step S8 illustrated in FIG. 3 is performed (a pump-back operation is performed)

When the processing (ABS pressure-reduction and pump-back operation) of Step S8 is performed, the valves included in the ABS/VDC actuator 8 (such as the solenoid valves 311 and 313 (211 and 213) and the electric motor 401 for the pumps) are driven in the following manner, as illustrated in FIG. 4 (FIG. 4 illustrates the other system 300, and therefore the reference numerals of the other system 300 are also used in the following description).

(A1) The cut valve 301 (201); in an open state.
(B1) The suction valve 321 (221); in a close state.
(C1) The inlet solenoid valves 311 and 313 (211 and 213); in a closed state.
(D1) The outlet solenoid valves 325 and 327 (225 and 227); in an open state.
(E1) The pump 319 (219) (the electric motor 401 for the pumps); in a driven state.

The pump 319 (219) provided in the ABS/VDC actuator 8 is driven in the manner described above. As a result, the pressure-reduction control for returning the brake fluid in the wheel cylinders 7 to the master cylinder 2 is performed. When the processing of Step S8 is terminated, the processing according to the flowchart of FIG. 3 is also terminated.

When it is determined in Step S7 that the ABS pressure-reduction and pump-back operation is not required, the pump-back operation is terminated (Step S9). Then, the processing is terminated. When it is determined in Step S6 that the value of the brake non-operation timer is equal to or larger than the predetermined value, the processing is terminated.

According to the first embodiment configured as described above, after the operation of the brake pedal 60 is released (after it is determined as "NO" in Step S3 of FIG. 3), the pump 219 (319) of the ABS/VDC actuator 8 is driven under a state in which the cut valve 201 (301), the suction valve 221 (321), and the outlet solenoid valves 225 and 227 (325 and 327) are opened and the inlet solenoid valves 211 and 213 (311 and 313) are closed. As a result, the pressure-reduction control for returning the brake fluid in the wheel cylinders 7 to the master cylinder 2 is performed (Step S8). By the pressure-reduction control, the brake fluid remaining in the wheel cylinders 7 is returned to the master cylinder 2 via the pump 219 (319) (in other words, the brake fluid is pumped back). As a result, the brake fluid pressure of the wheel cylinders 7 is reduced. Further, the hydraulic pressure of the master cylinder 2 is increased. In this manner, the return characteristics of the electric actuation unit 3 are improved. Therefore, even if the viscosity of the grease applied onto the rotary-to-linear motion converting mechanism 23 is increased when the temperature is low or even if a spring force of a return spring is lowered or a frictional resistance between the components is increased due to a change with elapse of time, the pistons (primary piston 11 and secondary piston 12) of the master cylinder 2 can be appropriately returned to the initial positions. As a result, a drag state of brake pads can be prevented from being brought about, which can in turn improve the fuel efficiency of the vehicle. In addition, the safety of the system can be improved. The initial positions are positions of the pistons (11 and 12), which allow the pressure chambers formed inside the master cylinder 2 and the reservoir 10 for storing the brake fluid to be brought into communication with each other.

Moreover, for the return spring used for mechanically releasing the brake fluid pressure when a failure occurs in the electric actuation unit 3 (electric rotary motor 21), the return characteristics of the electric actuation unit 3 can be improved without increasing the spring force in consideration of the increase in viscosity of the grease, which is caused with the use of the grease in a low-temperature environment, and therefore without increasing the return spring in size. Thus, the brake system can be correspondingly reduced in size.

Further, when the return spring having a large spring force is used, a large motor current is required to generate the brake fluid pressure against the large spring force for demonstrating the normal braking function. According to this embodiment, however, the large motor current described above is not required. Thus, a power source such as a battery can be correspondingly reduced in size. Further, the determination (determination of an elapsed time from the termination of the brake operation) of Step S6 is appropriately performed so as to perform the pump-back operation only when needed during the control described above (FIG. 3). As a result, the durability of the ABS/VDC actuator 8 can be prevented from being degraded (lifetime can be prevented from being reduced). Further, by performing the control described above, even if the return characteristics of the electric actuation unit 3 are degraded when the brake pedal is released during the normal control, the brake fluid pressure of the wheel cylinders 7 can be reliably reduced to improve the return characteristics of the electric actuation unit 3.

Second Embodiment

Figure 3:
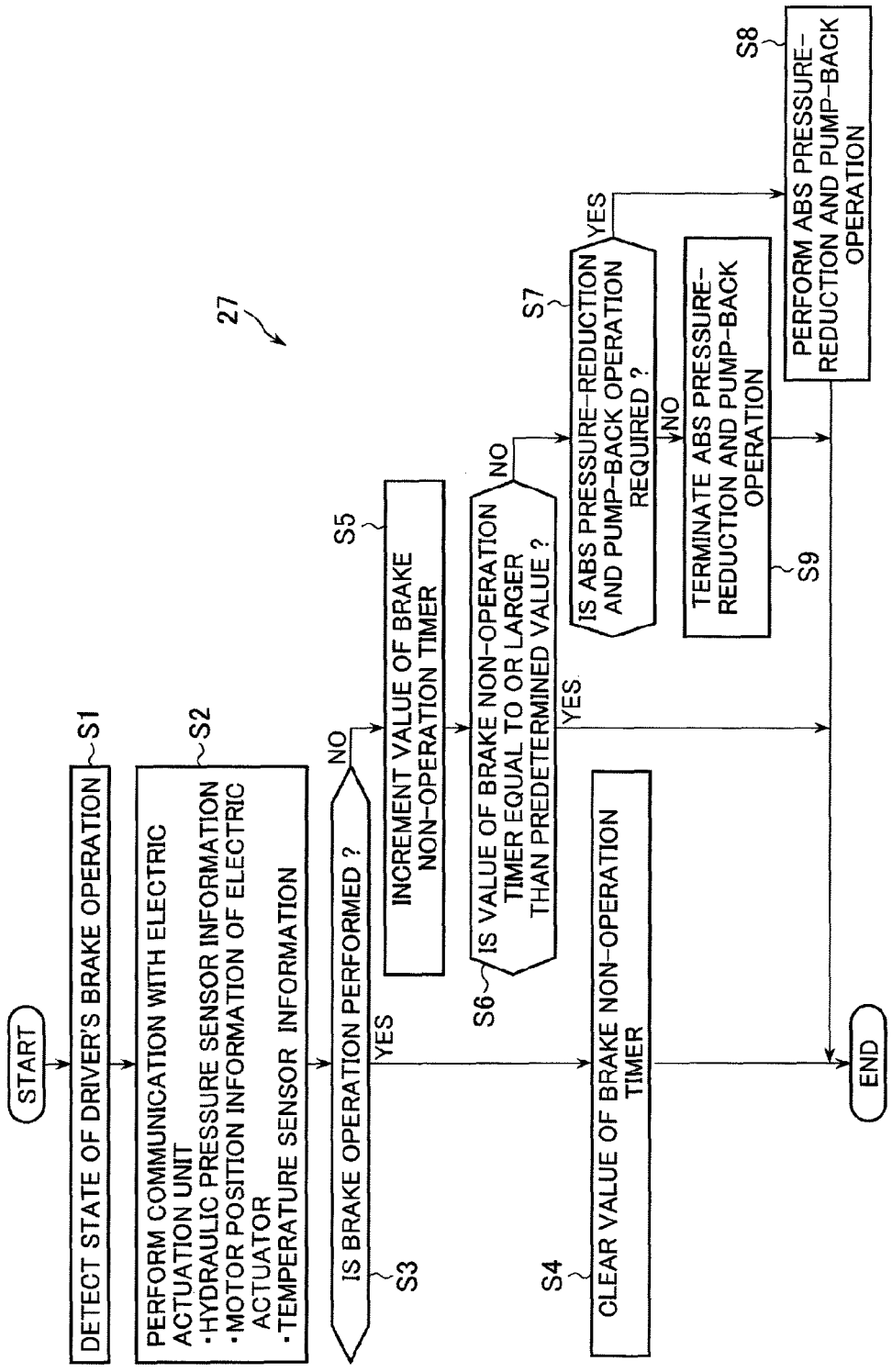
FIG. 3 is a flowchart illustrating contents of control performed by an ABS/VDC actuator ECU illustrated in FIG. 1.

In the first embodiment described above, the case where the ABS/VDC actuator ECU 27 performs the processing illustrated in FIG. 3 to improve the return characteristics of the electric actuation unit 3 is described as an example. However, an ABS/VDC actuator ECU 27A for performing processing illustrated in FIG. 5 may be configured to be used (hereinafter, described as a second embodiment) in place of the ABS/VDC actuator ECU 27 for performing the processing illustrated in FIG. 3. In the second embodiment, when a failure occurs in the electric actuation unit 3, the return control is performed to cope with the failure.

Figure 5:
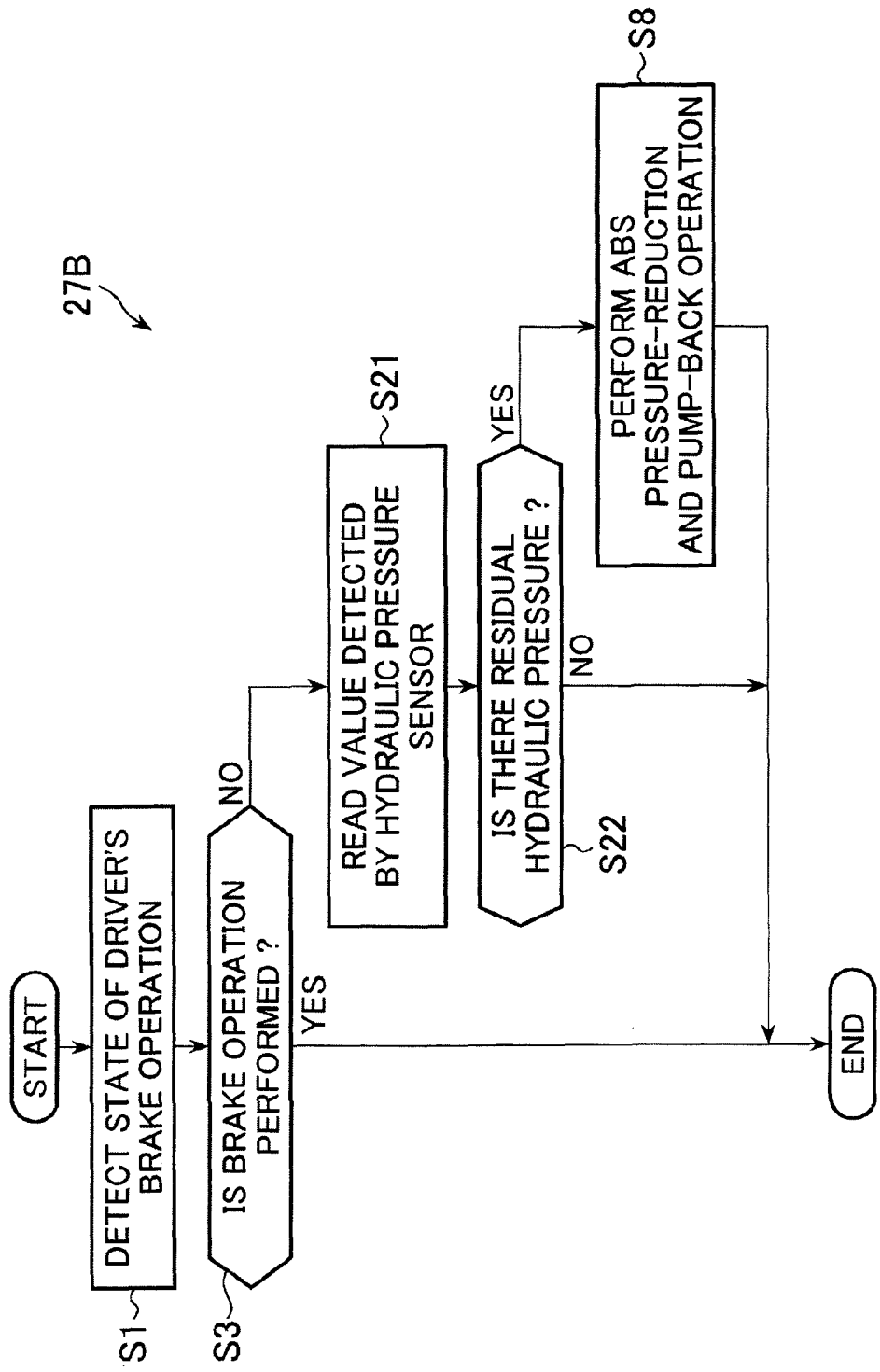
FIG. 5 is a flowchart for illustrating a second embodiment of the present invention.

As illustrated in FIG. 5, the ABS/VDC actuator ECU 27A of the second embodiment performs communication with the electric actuation ECU 29 and receives and transmits failure information of the electric actuation unit 3 through the communication (Step S2A) subsequent to the processing of the detection of the brake operation state by the driver (Step S1). Subsequent to Step S2A, it is determined whether or not the brake operation is performed by the driver (Step S3). In Step S3, when it is determined that the brake operation is performed by the driver, a value of an ABS pressure-reduction and pump-back timer is cleared (Step S11). Then, the processing of FIG. 5 is terminated. The ABS pressure-reduction and pump-back timer counts time relating to the ABS pressure-reduction and pump-back operation.

In Step S3, when it is determined that the brake operation is not performed by the driver, whether or not a failure has occurred in the electric actuation unit 3 is then determined (Step S12). In Step S12, for example, when the communication with the electric actuation unit 3 is not established or the failure information is received, it is determined that the failure has occurred in the electric actuation unit 3. Then, the value of the ABS pressure-reduction and pump-back timer is incremented (Step S13). Subsequent to Step S13, it is determined whether or not the value of the ABS pressure-reduction and pump-back timer is equal to or larger than a predetermined value, specifically, whether or not the ABS pressure-reduction and pump-back operation has been performed for a predetermined time or longer (Step S14). In Step S14, when it is determined that the ABS pressure-reduction and pump-back operation has not been performed for the predetermined time or longer, specifically, it is determined that the ABS pressure-reduction and pump-back operation has not been completed, the ABS pressure-reduction and pump-back operation is performed (Step S8). When the processing (ABS pressure-reduction and pump-back operation) of Step S8 is performed, the ABS/VDC actuator 8 (solenoid valves 211 and 213 (311 and 313) and electric motor 401 for the pumps) is driven in the same manner as that described in the above-mentioned example (FIG. 4). When it is determined in Step S14 that the ABS pressure-reduction and pump-back operation has been performed for the predetermined time or longer, the pump-back operation (see FIG. 4) is terminated (Step S9). Then, the processing is terminated.

In this second embodiment, in the case where it is determined that the failure has occurred in the electric actuation unit 3 after the operation of the brake pedal 60 is released (it is determined in Step S3 illustrated in FIG. 5 that "the brake operation is not performed") (Step S12), the pressure-reduction control is performed in the same manner as that of the first embodiment. The brake fluid remaining in the wheel cylinders 7 is returned to the master cylinder 2 via the pump 219 (319) to improve the return characteristics of the electric actuation unit 3. As a result, the fuel efficiency of the vehicle and the safety of the system can be improved.

Third Embodiment

In the first embodiment described above, the case where the ECU 27 performs the above-mentioned processing illustrated in FIG. 3 to improve the return characteristics of the electric actuation unit 3 is described as an example. However, an ECU 27B for performing processing illustrated in FIG. 6 may be configured to be used (hereinafter, described as a third embodiment) in place of the ECU 27 for performing the processing illustrated in FIG. 3.

In the third embodiment, an example of return control achieved by simplifying the processing of the first embodiment described above is described. The return control of the third embodiment is performed when it is detected that a residual pressure is generated in the brake fluid pressure in a state in which the brake operation is not performed by the driver.

Figure 6:
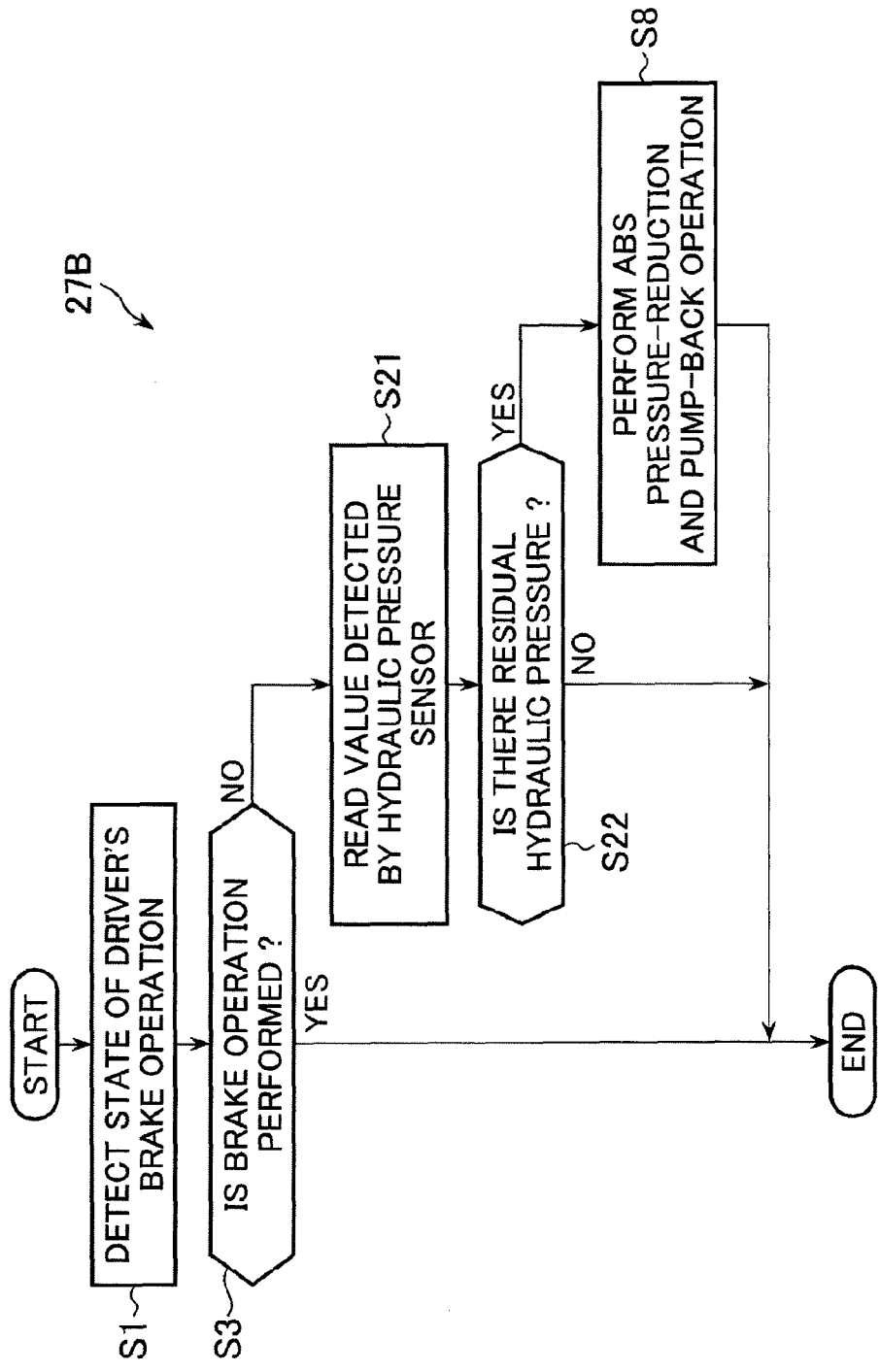
FIG. 6 is a flowchart for illustrating a third embodiment of the present invention.

As illustrated in FIG. 6, the ABS/VDC actuator ECU 27B detects the brake operation state by the driver (Step S1). Subsequent to Step S1, it is determined whether or not the brake operation is performed by the driver (Step S3). In Step S3, when it is determined that the brake operation is performed by the driver, the processing is terminated.

When it is determined in Step S3 that the brake operation is not performed by the driver, the value detected by the hydraulic pressure sensor 33 (Step S21) is read. Subsequent to Step S21, the read value detected by the hydraulic pressure sensor 33 is compared with a predefined threshold value so as to determine whether or not the residual pressure is still in the wheel cylinders 7 (whether or not hydraulic pressure is generated by the master cylinder 2) (Step S22).

In Step S22, when there is the residual pressure (hydraulic pressure is generated by the master cylinder 2), it is regarded that the electric rotary motor 21 is placed in an operation-disabled state (a failure has occurred) to perform the pump-back operation (see FIG. 4) (Step S8). On the other hand, in Step S22, when it is determined that there is no residual pressure, the processing is terminated. The determination of Step S3 may be performed after the determination of Step S22.

In the third embodiment, the value detected by the hydraulic pressure sensor 33 is compared with the threshold value after the operation of the brake pedal 60 is released (after it is determined as "NO" in Step S3 of FIG. 6). In this manner, whether or not there is the residual pressure in the master cylinder 2 (whether or not the failure has occurred in the electric rotary motor 21) is determined (Step S22).

When there is the residual pressure in the master cylinder 2, it is regarded that the failure has occurred in the electric rotary motor 21. Therefore, the pressure-reduction control is performed (Step S8) in the same manner as that of the first embodiment to improve the return characteristics of the electric actuation unit 3. Accordingly, the fuel efficiency of the vehicle and the safety of the system can be improved as in the first embodiment.

Fourth Embodiment

In the first embodiment described above, the case where the ECU 27 performs the above-mentioned processing illustrated in FIG. 3 to improve the return characteristics of the electric actuation unit 3 is described as an example. However, an ECU 27C for performing processing illustrated in FIG. 7 may be configured to be used (hereinafter, described as a fourth embodiment) in place of the ECU 27 for performing the processing illustrated in FIG. 3.

In the fourth embodiment, the brake fluid is temporarily stored in the wheel cylinders 7 by a VDC pressure-intensification operation corresponding to pressurization control for feeding the brake fluid in the master cylinder 2 to the wheel cylinders 7 by driving the ABS/VDC actuator 8. Then, the ABS pressure-reduction and pump-back operation is performed so as to pump the brake fluid in the wheel cylinders 7 back to the master cylinder 2. In this manner, the return control can be reliably performed for the electric actuation unit 3. Further, in the fourth embodiment, the pressurization control and the pressure-reduction control are repeated although the number of times of execution of the pressurization control and the pressure-reduction control may be one. By repeating the pressurization control and the pressure-reduction control, the return control can be more reliably performed.

Figure 7:
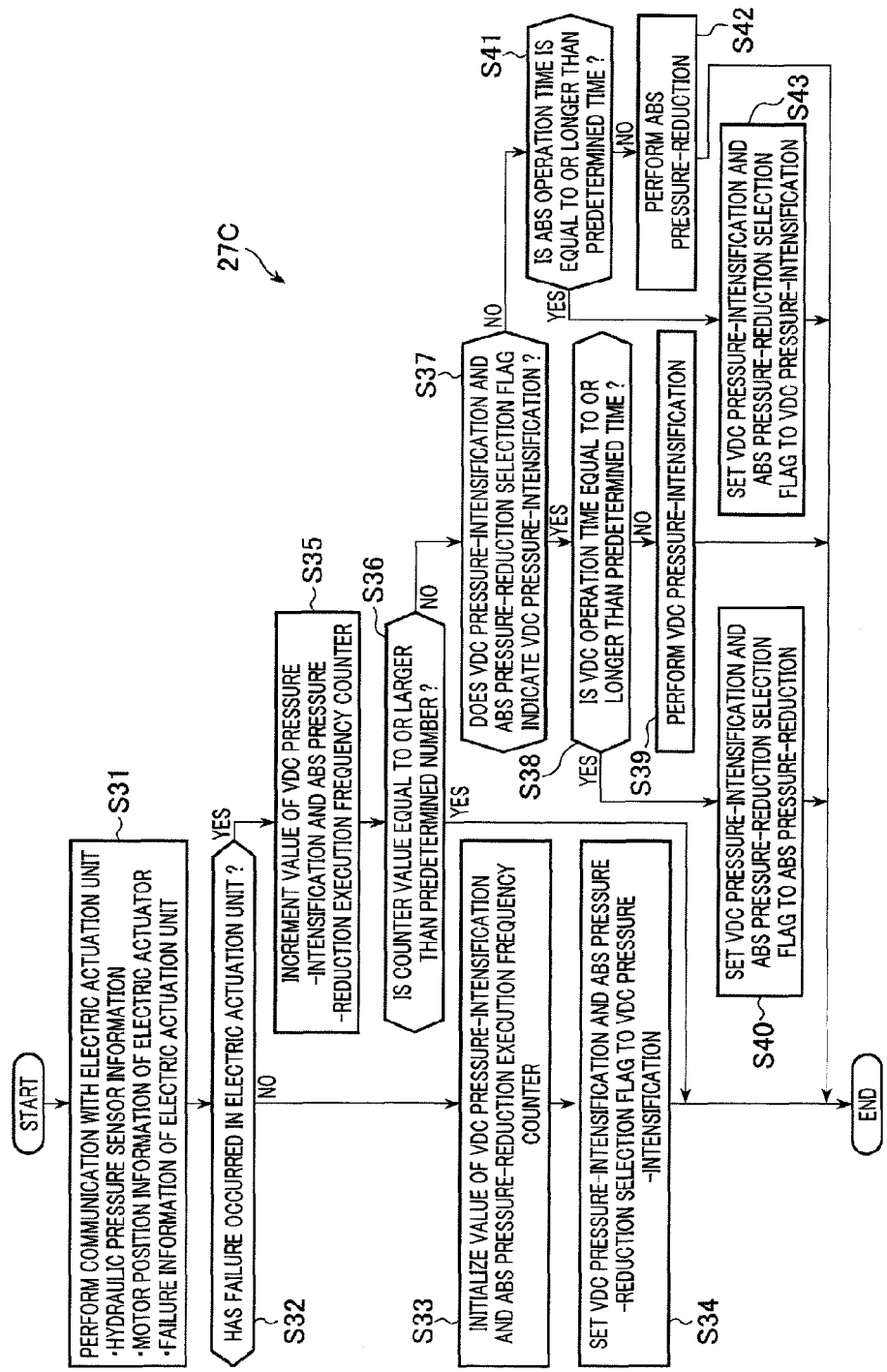
FIG. 7 is a flowchart for illustrating a fourth embodiment of the present invention.

First, an ABS/VDC actuator ECU 27C and the electric actuation ECU 29 perform communication with each other as illustrated in FIG. 7 (Step S31). In Step S31, the information detected by the hydraulic pressure sensor 33, the motor position information of the electric rotary motor 21, and the failure information of the electric actuation unit 3 are transmitted and received through the communication. Next, it is determined whether or not the failure has occurred in the electric actuation unit 3 (Step S32). In Step S32, when the communication with the electric actuation unit 3 (ECU 29) is not established or the failure information is received, it is determined that the failure has occurred in the electric actuation unit 3.

In Step S32, when it is determined that the failure has not occurred in the electric actuation unit 3, specifically, the electric actuation unit 3 operates normally, the processing proceeds to Step S33 in which a value of a VDC pressure-intensification and ABS pressure-reduction execution frequency counter is cleared (initialized). The VDC pressure-intensification and ABS pressure-reduction execution frequency counter counts the number of times of execution of the VDC pressure-intensification and ABS pressure-reduction operation.

Subsequent to Step S33, a VDC pressure-intensification and ABS pressure-reduction selection flag is set (Step S34). The VDC pressure-intensification and ABS pressure-reduction selection flag is a selection flag for alternately performing the VDC pressure-intensification operation and the ABS pressure-reduction operation. The number of execution of switching between VDC pressure-intensification and ABS pressure-reduction may be one or may be set so that the switching between VDC pressure-intensification and ABS pressure-reduction performed in this order is repeated a plurality of times. When the switching between VDC pressure-intensification and ABS pressure-reduction is repeated a plurality of times, the number of times may be set as a constant predetermined number. Moreover, the predetermined number of times can be set so as to be changed according to the degree of the failure occurring in the electric actuation unit 3 or other conditions.

In Step S32, when it is determined that the failure has occurred in the electric actuation unit 3, the value of the VDC pressure-intensification and ABS pressure-reduction execution frequency counter is incremented (Step S35). Subsequent to Step S35, whether or not the value of the VDC pressure-intensification and ABS pressure-reduction execution frequency counter is equal to or larger than a predetermined value (for example, three) is determined (Step S36). When it is determined that the number of times of execution of the VDC pressure-intensification and ABS pressure-reduction is equal to or larger than the predetermined number in Step S36, the processing is terminated. By the termination of the processing, the number of times of the switching between VDC pressure-intensification and ABS pressure-reduction is limited to the predetermined number. When it is determined in Step S36 that the number of times of execution of the combination of the VDC pressure-intensification and the ABS pressure-reduction is less than the predetermined number, the processing proceeds to Step S37 in which whether or not the VDC pressure-intensification and ABS pressure-reduction selection flag indicates the VDC pressure-intensification is determined. Specifically, in Step S36, any one of the VDC pressure-intensification operation and the ABS pressure-reduction operation is selected. In Step S37, when it is determined that the flag indicates the VDC pressure-intensification operation, it is then determined whether or not the VDC pressure-intensification operation has been performed for a predetermined time (Step S38). In a control initial stage (of the first cycle) in the fourth embodiment, the VDC pressure-intensification operation is set. Therefore, the result of determination of Step S37 is YES. After the processing of Step S37, the determination processing of Step S38 is performed.

In Step S38, when an elapsed time from the start of the VDC pressure-intensification operation is less than the predetermined time, the processing proceeds to Step S39 in which the VDC pressure-intensification operation is continuously performed until the elapsed time reaches the predetermined time. The predetermined time is a time for a single operation of the VDC pressure intensification, i.e., a time for supplying a certain volume of the brake fluid into the wheel cylinders 7. The time check of the predetermined time is started when it is determined that the flag indicates the VDC pressure-intensification operation in Step 37, that is, at a cycle after the first cycle of the control, when the switching from the ABS pressure-reduction operation to the VDC pressure-intensification operation is determined.

Figure 8:
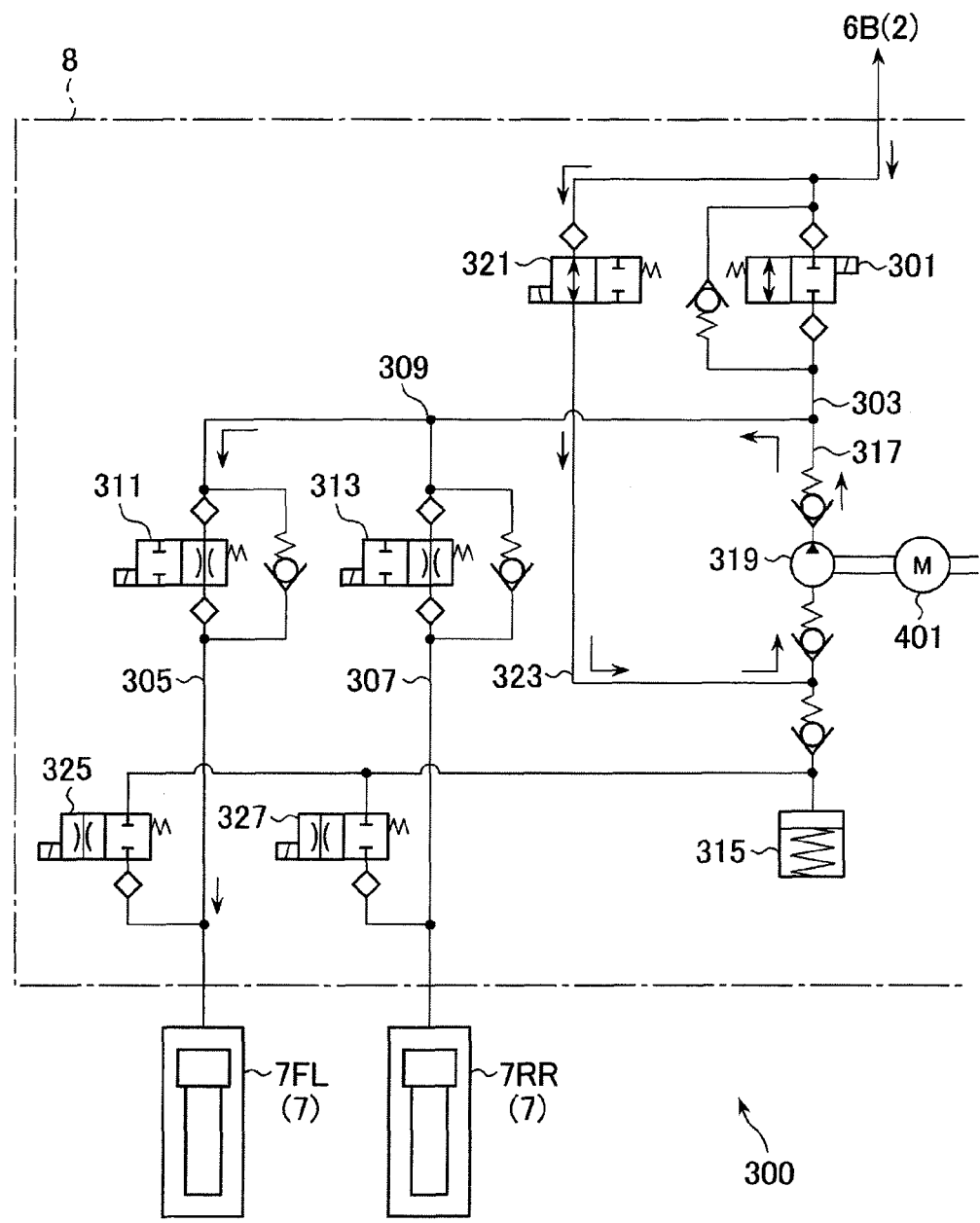
FIG. 8 is a view for illustrating drive statuses of the valves and the motor included in the ABS/VDC actuator when processing of Step S39 illustrated in FIG. 7 is performed (VDC pressure-intensification is performed).

During the processing (VDC pressure-intensification) of the Step S39, the ABS/VDC actuator 8 (solenoid valves 311 and 313 (211 and 213) and electric motor 401 for the pumps) is driven in the following manner as illustrated in FIG. 8:

(A2) The cut valve 301 (201); in a closed state.
(B2) The suction valve 321 (221); in an open state.
(C2) The inlet solenoid valves 311 and 313 (211 and 213); in an open state.
(D2) The outlet solenoid valves 325 and 327 (225 and 227); in a closed state.

(E2) The pump 319 (219) (the electric motor 401 for the pumps); in a driven state.

Then, when the ABS/VDC actuator 8 (solenoid valves 211 and 213 (311 and 313) and electric motor 401 for the pumps) is driven as described above in the items (A2) to (E2) (see FIG. 8), the brake fluid moves from the master cylinder 2 into the wheel cylinders 7.

In Step S38, when it is determined that the predetermined time has elapsed, the VDC pressure-intensification and ABS pressure-reduction selection flag is set to the ABS pressure-reduction (Step S40).

It is recommended that the VDC pressure-intensification operation of Step S38 illustrated in FIG. 7 be performed at an extremely low pressure so as not to affect a vehicle behavior while the vehicle is running.

In order to reduce uncomfortable feeling of a driver, control may be performed so that a slightly high hydraulic pressure is applied based on a signal from the accelerator-pedal operation detection sensor 43 when the acceleration pedal 41 is released. Further, when the operation of the parking brake is detected based on a signal from the parking brake state detection sensor 37 for detecting the state (the operating state and the non-operating state) of the parking brake, the VDC pressure-intensification operation for applying a high hydraulic pressure may be performed because the vehicle is in a stopped state.

As described above, the control (loop) illustrated in FIG. 7 is repeatedly performed while an elapsed time from the start of the VDC pressure-intensification operation is monitored. When the elapsed time becomes equal to or longer than the predetermined time, it is determined in Step S38 that the predetermined time has elapsed. Then, the processing proceeds to Step 40 in which the VDC pressure-intensification and ABS pressure-reduction flag is set to the ABS pressure-reduction. Then, the VDC pressure-intensification operation is terminated.

In the processing of the next cycle, it is determined in Step S37 that the VDC pressure-intensification and ABS pressure-reduction selection flag indicates the ABS pressure-reduction. Then, the processing proceeds to Step S41 in which whether or not the ABS pressure-reduction operation has been performed for a predetermined time is determined.

In Step S41, when the elapsed time from the start of the ABS pressure-reduction operation is less than the predetermined time, the processing proceeds to Step S42 in which the ABS pressure-reduction operation is continuously performed until the elapsed time reaches the predetermined time. The predetermined time is a time for a single operation of the ABS pressure-reduction operation, i.e., a time for pump-back operation of the brake fluid in the wheel cylinders 7 to the master cylinder 2. The time check of the predetermined time is started when it is determined that the flag indicates the ABS pressure-reduction operation in Step 37, that is, at a cycle after the first cycle of the control, when the switching from the VDC pressure-intensification operation to the ABS pressure-reduction operation is determined.

In Step S41, when it is determined that the predetermined time has elapsed, the VDC pressure-intensification and ABS pressure-reduction selection flag is set to the VDC pressure-intensification (Step S43).

As in the case of the monitoring of the elapsed time from the start of the VDC pressure-intensification operation described above, the loop illustrated in FIG. 7 is repeated while the ABS pressure-reduction operation time is monitored. When the elapsed time becomes equal to or longer than the predetermined time, it is determined in Step S41 that the elapsed time has reached the predetermined time. Then, in Step S43, the VDC pressure-intensification and ABS pressure-reduction selection flag is set to the VDC pressure-intensification, and the ABS pressure-reduction operation is terminated.

When the switching of the VDC pressure-intensification operation and ABS pressure-reduction operation is repeated a predetermined number of times as described above, it is determined in Step S36 that "the number of times of execution of the VDC pressure-intensification and ABS pressure-reduction operation becomes equal to or larger than the predetermined number". Therefore, the VDC pressure-intensification operation and the ABS pressure-reduction operation are inhibited from then on.

In the operation series described above referring to FIG. 7, the brake fluid is temporarily stored in the wheel cylinders 7 by the VDC pressure-intensification operation (Step S39). Then, the brake fluid in the wheel cylinders 7 is pumped back to the master cylinder 2 by the ABS pressure-reduction and pump-back operation (Step S42).

By repeating the combined operation of the ABS pressure-reduction and the VDC pressure-intensification described above, the return characteristics of the electric actuation unit 3 (electric rotary motor 21) can be prevented from being degraded with an increase in viscosity of the grease applied onto the rotary-to-linear motion converting mechanism 23, which is caused due to a reduction in ambient temperature or the like. As a result, good return characteristics can be ensured.

For the amount of pressure intensification at the time of the VDC pressure-intensification, the contents of control described in the following items (a) to (c) are executed. As a result, the electric actuation unit 3 can be reliably returned without giving an uncomfortable feeling to the driver:

(a) An extremely low hydraulic pressure is set so as not to affect the vehicle behavior while the vehicle is running;

(b) A slightly high hydraulic pressure is set when the accelerator pedal 41 is released; and (c) A high hydraulic pressure is set when the parking brake is operated.

In this fourth embodiment, the number of repeat times of the combination "VDC pressure-intensification and ABS pressure-reduction" in this order performed in Step S36 is determined based on the comparison with the constant (or variable) predetermined number. Alternatively, however, the number of repeat times may be determined based on the value detected by the hydraulic pressure by the hydraulic pressure sensor 33 or the like. Specifically, when it is detected that no hydraulic pressure is generated (there is no residual pressure) based on the value detected by the hydraulic pressure sensor 33 or the like during the ABS pressure-reduction operation, the pistons (11, 12) of the master cylinder 2 are returned to the initial positions. Therefore, Step S36 can alternatively be a step in which the processing is terminated when no hydraulic pressure is detected by the hydraulic pressure sensor 33 or the like.

Further alternatively, Step S36 can also be a step in which it is determined that the pistons (11, 12) of the master cylinder 2 are returned to the initial positions when it is detected that the electric rotary motor has returned to the predetermined reference position based on the position information from the motor position detection sensor 45 during the ABS pressure-reduction operation and the processing is terminated based on the determination.

Further, the VDC pressure-intensification operation is performed in Step S38 and the ABS pressure-reduction operation is performed in Step S41 respectively for the predetermined time. The termination of each of the operations may be determined based on the value of the hydraulic pressure detected by the hydraulic pressure sensor 33 or the like in place of the predetermined time. Specifically, Step S38 can alternatively be a step in which the VDC pressure-intensification operation is terminated when the hydraulic pressure detected by the hydraulic pressure sensor (not shown) for the wheel cylinders during the VDC pressure-reduction operation reaches a pressure-intensification reference pressure. Similarly, Step S41 can also be a step in which the ABS pressure-reduction operation is terminated when it is detected that no hydraulic pressure is detected by the hydraulic pressure sensor 33 (there is no residual pressure) during the ABS pressure-reduction operation.

In the case of the ABS pressure-reduction operation, it is desirable that the ABS pressure-reduction operation be terminated when no residual-pressure state is not achieved within the predetermined time and be performed in combination with the predetermined time.

In each of the embodiments described above, the brake system, which uses the electric actuation unit 3 using the rotary motor as the booster, has been described. However, the booster is not limited to the rotary motor described above. A linear motor may be used as the booster. Further, the booster is not limited to an electric booster and may also be a hydraulic booster described in Japanese Patent Application Laid-open No. 2006-240542. Further alternatively, a negative-pressure booster using negative-pressure air may be used. Thus, as the booster, any booster which can generate an output larger than input of the brake pedal may be used regardless of the type of power source.

Moreover, in the embodiments described above, the example where the release of the actuation of the pistons performed by the booster is determined based on the release of the operation of the brake pedal has been described. However, the determination is not limited thereto. The determination may be made based on a state in which the pistons of the master cylinder are to be returned to positions where the wheel cylinders are not actuated, such as a release state of an automatic brake.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2010-046826, filed on Mar. 3, 2010. The entire disclosure of Japanese Patent Application No. 2010-046826, filed on Mar. 3, 2010 including specification, claims, drawings and summary is incorporated herein by reference in its entirety.

What is claimed is:

1. A brake system, comprising:
a master cylinder having a piston, and being configured to generate brake fluid pressure by movement of the piston;
a booster configured to actuate the piston of the master cylinder;
wheel cylinders;
a hydraulic pressure control mechanism disposed between the master cylinder and the wheel cylinders, the hydraulic pressure control mechanism including a pump configured to perform pressure-intensification control and pressure-reduction control of the brake fluid pressure for the wheel cylinders; and
a control device configured to control the hydraulic pressure control mechanism, the control device being connected to a hydraulic pressure detection device configured to detect the brake fluid pressure generated in the master cylinder, the control device being configured to perform the pressure-reduction control for returning brake fluid in the wheel cylinders to the master cylinder by driving the pump of the hydraulic pressure control mechanism when the hydraulic pressure detection device detects that hydraulic pressure is equal to or higher than a predetermined hydraulic pressure after the actuation of the piston by the booster is released, to increase the hydraulic pressure of the master cylinder.

2. A brake system according to claim 1, wherein the control device is configured to release of the actuation of the piston by the booster, the release comprising release of an operation of a brake pedal.

3. A brake system according to claim 2, wherein the control device is configured to perform the pressure-intensification control for feeding the brake fluid in the master cylinder to the wheel cylinders by the hydraulic pressure control mechanism before the pressure-reduction control is performed.

4. A brake system according to claim 3, wherein the control device is configured to perform each of the pressure-intensification control and the pressure-reduction control once.

5. A brake system according to claim 3, wherein the control device is configured to inhibit actuation of the hydraulic pressure control mechanism after repeatedly performing the pressure-intensification control and the pressure-reduction control a predetermined number of times.

6. A brake system according to claim 3, wherein
control device is configured to repeatedly perform the pressure-intensification control and the pressure-reduction control, and to terminate repeating control when the hydraulic pressure detection device detects that no hydraulic pressure is generated after the pressure-intensification control and the pressure-reduction control are repeatedly performed.

7. A brake system according to claim 1, wherein
the booster comprises an electric actuation unit including an electric motor, and
the control device is configured to perform the pressure-reduction control when a failure has been determined to have occurred in the electric actuation unit.

8. A brake system according to claim 1, wherein:
the control device is connected to a pedal operation detection device configured to detect an operation of a brake pedal, and
the control device determines that the actuation of the piston by the booster is released when a non-operating state is detected by the pedal operation detection device.

9. A brake system, comprising:
a master cylinder having a piston;
wheel cylinders;
a brake-pedal operation detection device configured to detect an operation of a brake pedal;
a booster having an electric motor, and being configured to generate brake fluid pressure in the master cylinder by actuating the piston of the master cylinder by rotating the electric motor based on a result of detection of the brake-pedal operation detection device;
a hydraulic pressure control mechanism disposed in a pipe between the master cylinder and the wheel cylinders, and being configured to perform pressure intensification and pressure reduction of the brake fluid pressure for the pipe; and a control device configured to control the hydraulic pressure control mechanism and the electric motor of the booster,
the control device performing the pressure intensification for the master cylinder by the hydraulic pressure control mechanism through an intermediation of the pipe, when a rotational position of a rotor of the electric motor of the booster does not reach a predetermined position after release of the operation of the brake pedal is detected by the brake-pedal operation detection device.

10. A brake system according to claim 9, wherein the control device is configured to feed brake fluid in the master cylinder to the wheel cylinders by the hydraulic pressure control mechanism before the pressure intensification for the master cylinder is performed.

11. A brake system according to claim 10, wherein the control device is configured to feed the brake fluid to the wheel cylinders and perform the pressure intensification for the master cylinder once.

12. A brake system according to claim 10, wherein the control device is configured to inhibit actuation of the hydraulic pressure control mechanism after repeatedly feeding the brake fluid to the wheel cylinders and performing the pressure intensification for the master cylinder a predetermined number of times.

13. A brake system according to claim 10, wherein
the control device is connected to a hydraulic pressure detection mechanism configured to detect the brake fluid pressure generated in the master cylinder, and
when the hydraulic pressure detection device detects that no hydraulic pressure is generated after the control device repeatedly feeds the brake fluid to the wheel cylinders and performs the pressure intensification for the master cylinder, the repeat of the control is terminated.

14. A brake system according to claim 9, wherein
the booster comprises an electric actuation unit that includes the electric rotary motor, and
the control is configured to perform the pressure intensification for the master cylinder, when a failure has been determined to have occurred in the electric actuation unit.

15. A brake system according to claim 9, wherein
the control device is connected to a hydraulic pressure detection device configured to detect the brake fluid pressure generated in the master cylinder, and
when the brake-pedal operation detection detects a non-operating state and the hydraulic pressure detection device detects generation of hydraulic pressure, the pressure reduction is performed.

16. A brake system, comprising:
wheel cylinders;
a master cylinder having a piston, and being configured to generate brake fluid pressure by movement of the piston;
a booster having an electric motor, and being configured to actuate the piston of the master cylinder by rotation of the electric motor;
a hydraulic pressure control mechanism disposed between the master cylinder and the wheel cylinders, the hydraulic pressure control mechanism including a pump, and being configured to perform pressure intensification and pressure reduction of the brake fluid pressure for the wheel cylinders;
a hydraulic pressure detection device disposed between the master cylinder and the wheel cylinders, and being configured to detect the brake fluid pressure; and a control device connected to the hydraulic pressure detection device and a control circuit of the electric motor of the booster, and being configured to control the hydraulic pressure control mechanism, wherein, after the booster releases actuation of the piston, when the hydraulic pressure detection device detects that hydraulic pressure is equal to or higher than a predetermined hydraulic pressure and when a rotational position of a rotor of the electric motor of the booster does not reach a predetermined position, the control device performs the pressure reduction control for returning a brake fluid in the wheel cylinders to the master cylinder by driving the pump of the hydraulic pressure control mechanism.

17. A brake system according to claim 16, wherein the control device is configured to perform the pressure intensification control for feeding the brake fluid in the master cylinder to the wheel cylinders by the hydraulic pressure control mechanism before the pressure reduction control is performed.

18. A brake system according to claim 17, wherein the control device is configured to perform each of the pressure intensification control and the pressure reduction control once.

19. A brake system according to claim 17, wherein the control device is configured to inhibit actuation of the hydraulic pressure control mechanism after repeatedly performing the pressure intensification control and the pressure reduction control a predetermined number of times.

20. A brake system according to claim 17, wherein, when the hydraulic pressure detection device detects that no hydraulic pressure is generated after the control device repeatedly performs the pressure intensification control and the pressure reduction control, the control device terminates the repeat of the control.

* * * * *